(12) United States Patent
Chang

(10) Patent No.: US 10,581,803 B1
(45) Date of Patent: *Mar. 3, 2020

(54) APPLICATION-AWARE CONNECTION RULES FOR NETWORK ACCESS CLIENT

(71) Applicant: Pulse Secure, LLC, San Jose, CA (US)

(72) Inventor: Thomas C. Chang, Lexington, MA (US)

(73) Assignee: Pulse Secure, LLC, San Jose, CA (US)

( * ) Notice: Subject to any disclaimer, the term of this patent is extended or adjusted under 35 U.S.C. 154(b) by 89 days.

This patent is subject to a terminal disclaimer.

(21) Appl. No.: 15/896,652

(22) Filed: Feb. 14, 2018

Related U.S. Application Data

(63) Continuation of application No. 15/433,727, filed on Feb. 15, 2017, now Pat. No. 9,923,871, which is a continuation of application No. 13/938,194, filed on Jul. 9, 2013, now Pat. No. 9,608,962.

(51) Int. Cl.
 *H04L 29/06* (2006.01)
(52) U.S. Cl.
 CPC ...... *H04L 63/0272* (2013.01); *H04L 63/0428* (2013.01)
(58) Field of Classification Search
 None
 See application file for complete search history.

(56) References Cited

U.S. PATENT DOCUMENTS

| | | | |
|---|---|---|---|
| 6,473,863 B1 | 10/2002 | Genty et al. | |
| 6,675,225 B1 | 1/2004 | Genty et al. | |
| 6,751,190 B1 | 6/2004 | Swallow | |
| 6,915,436 B1 | 7/2005 | Booth, III et al. | |
| 7,673,048 B1 | 3/2010 | O'Toole, Jr. et al. | |
| 7,756,510 B2 | 7/2010 | Lee et al. | |
| 7,849,505 B2 | 12/2010 | Satterlee et al. | |
| 7,890,992 B2 | 2/2011 | Schwartzman et al. | |
| 8,001,610 B1 | 8/2011 | Chickering et al. | |
| 8,127,350 B2 | 2/2012 | Wei et al. | |
| 8,387,131 B2 | 2/2013 | Beachem | |

(Continued)

OTHER PUBLICATIONS

"802.1X IEEE Standard for Local and Metropolitan Area Networks—Port Based Network Access Control," IEEE Computer Society, Dec. 13, 2004, 179 pp.

(Continued)

*Primary Examiner* — Benjamin E Lanier
(74) *Attorney, Agent, or Firm* — Shumaker & Sieffert, P.A.

(57) ABSTRACT

Virtual private network (VPN)-related techniques are described. The techniques provide intuitive mechanisms by which a client device more efficiently establishes a VPN connection. In one example, a client device includes a memory, processor(s), and a VPN handler. The VPN handler is configured to monitor actions initiated by one or more applications executable by the programmable processor(s), and determine whether each of the initiated actions requires a VPN connection via which to transmit outbound data traffic corresponding to a respective application of the one or more applications. The VPN handler is further configured to, in response to a detection that at least one initiated action requires the VPN connection via which to transmit the outbound data traffic, automatically establish the VPN connection to couple the client device to an enterprise network, and transmit the outbound data traffic corresponding to the respective application, via the VPN connection.

21 Claims, 3 Drawing Sheets

(56) References Cited

U.S. PATENT DOCUMENTS

| | | |
|---|---|---|
| 8,443,435 B1 | 5/2013 | Schroeder |
| 9,608,962 B1 | 3/2017 | Chang |
| 9,923,871 B1 | 3/2018 | Chang |
| 2002/0144144 A1 | 10/2002 | Weiss et al. |
| 2002/0152320 A1 | 10/2002 | Lau |
| 2003/0041136 A1 | 2/2003 | Cheline et al. |
| 2003/0088698 A1 | 5/2003 | Singh et al. |
| 2003/0177396 A1 | 9/2003 | Bartlett et al. |
| 2004/0225895 A1 | 11/2004 | Mukherjee et al. |
| 2004/0268142 A1 | 12/2004 | Karjala et al. |
| 2005/0021844 A1 | 1/2005 | Puon et al. |
| 2005/0125542 A1 | 6/2005 | Zhu |
| 2005/0185644 A1 | 8/2005 | Tsuji et al. |
| 2006/0094400 A1 | 5/2006 | Beachem et al. |
| 2006/0185012 A1 | 8/2006 | Olivereau et al. |
| 2006/0230446 A1 | 10/2006 | Vu |
| 2006/0282889 A1 | 12/2006 | Brown et al. |
| 2007/0094723 A1 | 4/2007 | Short et al. |
| 2008/0034072 A1 | 2/2008 | He et al. |
| 2008/0034416 A1 | 2/2008 | Kumar et al. |
| 2008/0043760 A1 | 2/2008 | Venkatraman et al. |
| 2008/0144625 A1 | 6/2008 | Wu et al. |
| 2008/0201486 A1 | 8/2008 | Hsu et al. |
| 2008/0212503 A1 | 9/2008 | Lipford et al. |
| 2009/0043891 A1 | 2/2009 | Woo et al. |
| 2009/0061847 A1 | 3/2009 | Roberts |
| 2010/0058442 A1 | 3/2010 | Costa et al. |
| 2010/0278181 A1 | 11/2010 | Liu et al. |
| 2010/0293610 A1 | 11/2010 | Beachem et al. |
| 2011/0162062 A1 | 6/2011 | Kumar et al. |
| 2012/0084184 A1 | 4/2012 | Raleigh et al. |
| 2012/0159607 A1 | 6/2012 | Wei et al. |
| 2013/0036468 A1 | 2/2013 | Georgiev |
| 2014/0059606 A1 | 2/2014 | Selim |

OTHER PUBLICATIONS

"Juniper Networks Secure Access—Administration Guide", Release 6.5, Juniper Networks, Inc., 2008, accessed on Jul. 9, 2013, 1078 pp.

Zeil, "C5333 Lab: Supplying Inputs to Programs," Old Dominion University, 2008, accessed on Dec. 11, 2015, pp. 1-5.

Prosecution History from U.S. Pat. No. 9,608,962, dated Nov. 10, 2014 through Nov. 30, 2016, 223 pp.

Prosecution History from U.S. Pat. No. 9,923,871, dated Jul. 21, 2017 through Nov. 2, 2017, 36 pp.

"Connect automatically to open Wi-Fi networks," Nexus Help, Wireless & connectivity settings, accessed on Mar. 21, 2017, from https://supportgoogle.com/nexus/answer/6327199?hl=en, 2 pp.

APPLICATION-AWARE CONNECTION RULES FOR NETWORK ACCESS CLIENT

PRIORITY CLAIM

This application is a continuation of U.S. application Ser. No. 15/433,727, filed 15 Feb. 2017, which is a continuation of U.S. application Ser. No. 13/938,194, filed 9 Jul. 2013 (now issued U.S. Pat. No. 9,608,962 B1), the entire content of each of which is incorporated herein by reference.

TECHNICAL FIELD

This disclosure generally relates to computer networks, and more specifically, to secure data connections established over a computer network.

BACKGROUND

Enterprises use virtual private networks (VPNs) to allow employees to securely access, modify, or otherwise communicate with enterprise resources over public networks. For example, an enterprise deploys a VPN concentrator, also referred to as a VPN gateway, to provide secure access to the enterprise resources. An employee using a client device at a remote location may establish a VPN connection to the VPN gateway through a public network, such as the Internet. The use of a VPN provides assurances that others on the public network cannot intercept, read, or reuse communications sent on the VPN.

Client devices that enable employees to avail of VPN connections are often equipped with VPN client software. In many instances, VPN client software is configured to detect scenarios where the client device requires a VPN connection to access enterprise resources. In turn, the VPN client software may be configured to automatically establish the VPN connection in response to detecting such a scenario, without requiring any action from the employee using the client device. As one example, VPN client software is configured to detect the current location of the client device based on an internet protocol (IP) address issued to the client device. If the IP address indicates that the client device requires a VPN connection to access the enterprise resources, the VPN client software automatically establishes the VPN connection, enabling the employee using the client device to securely access the enterprise resources.

SUMMARY

In general, techniques are described by which a VPN client monitors application activity and establishes a VPN tunnel. According to some examples, techniques of this disclosure are generally directed to detecting conditions under which the use of a client device does not require a VPN connection, and determining, based on the detected conditions, not to automatically establish a VPN connection. As one example, the VPN client implements one or more rules that monitor for certain work-related applications. If the VPN client determines initiation or execution of a particular application satisfying the rules, the VPN client automatically establishes the VPN connection. For instance, the client device may provide or more functionalities that do not require any access to enterprise resources, such as enabling a user to browse the Internet. In this scenario, the client device may execute functionalities that are dependent on a network connection, such as a connection to the Internet, but not necessarily on a VPN connection that enables access to the enterprise resources.

Examples of activities that potentially require a VPN connection include actions initiated by the applications, such as invoking applications that are associated with accessing enterprise resources, such as email client software used to access enterprise email. Another example of such initiated actions includes accessing a particular website using browser software, such as accessing a web interface to the employer's enterprise email server. If the client device detects an initiated action that requires a VPN connection, the client device establishes, or attempts to establish, the VPN connection. Conversely, if the client device does not detect any activity that requires a VPN connection, the client device may continue to operate using one or more currently-active network connections, or with no network connection at all. In some scenarios where the client device establishes the VPN connection, the client device handles data in accordance with the configuration of the VPN connection. For instance, the client device may encrypt or encapsulate outbound data to be transmitted over the VPN connection, and may decrypt or de-encapsulate inbound data received over the VPN connection.

In one example, a method includes monitoring, by a client device, actions initiated by one or more applications installed on the client device, and determining, by the client device, whether each of the initiated actions requires a secure data connection via which to transmit outbound data traffic corresponding to a respective application of the one or more applications. The method further includes, in response to detecting that at least one initiated action requires the secure data connection via which to transmit the outbound data traffic, automatically establishing, by the client device, the secure data connection to couple the client device to an enterprise network, and transmitting, by the client device, the outbound data traffic corresponding to the respective application, via the secure data connection.

In another example, a device includes a memory, one or more programmable processors, and a virtual private network (VPN) handler. The VPN handler is configured to monitor actions initiated by one or more applications executable by the one or more programmable processors, and determine whether each of the initiated actions requires a VPN connection via which to transmit outbound data traffic corresponding to a respective application of the one or more applications. The VPN handler is further configured to, in response to a detection that at least one initiated action requires the VPN connection via which to transmit the outbound data traffic, automatically establish the VPN connection to couple the client device to an enterprise network, and transmit the outbound data traffic corresponding to the respective application, via the VPN connection.

In another example, a computer-readable medium is encoded with instructions. The instructions, when executed, cause at least one processor of a client device to perform operations. The operations include monitoring actions initiated by one or more applications installed on the client device, and determining whether each of the initiated actions requires a secure data connection via which to transmit outbound data traffic corresponding to a respective application of the one or more applications. The operations further include, in response to detecting that at least one initiated action requires the secure data connection via which to transmit the outbound data traffic, automatically establishing the secure data connection to couple the client device to an enterprise network, and transmitting the outbound data traffic corresponding to the respective application, via the secure data connection.

The techniques described herein may provide one or more potential advantages. As one example, a client device implementing the techniques may enable a user to interact over a network connection, while establishing a VPN connection only in situations where the user requires access to enterprise resources. By limiting VPN connections to such situations, the client device may reduce or even eliminate unnecessary data traffic through the VPN tunnel, thereby mitigating bandwidth consumption, and potentially improving a local network connection speed. As another example, by reducing or eliminating unnecessary data traffic through the VPN tunnel, the client device may conserve computing resources at enterprise devices, such as an email server used by the enterprise. Additionally, the VPN client may implement the rules for selective VPN establishment in combination with other existing network-based rules to which the client device conforms. Moreover, the techniques can be implemented using existing hardware, software, and network administration infrastructure, thereby providing the potential advantages described above without requiring possibly cumbersome system upgrades.

The details of one or more examples of this disclosure are set forth in the accompanying drawings and the description below. Other features, objects, and advantages will be apparent from the description and drawings, and from the claims.

DETAILED DESCRIPTION

Figure 1:
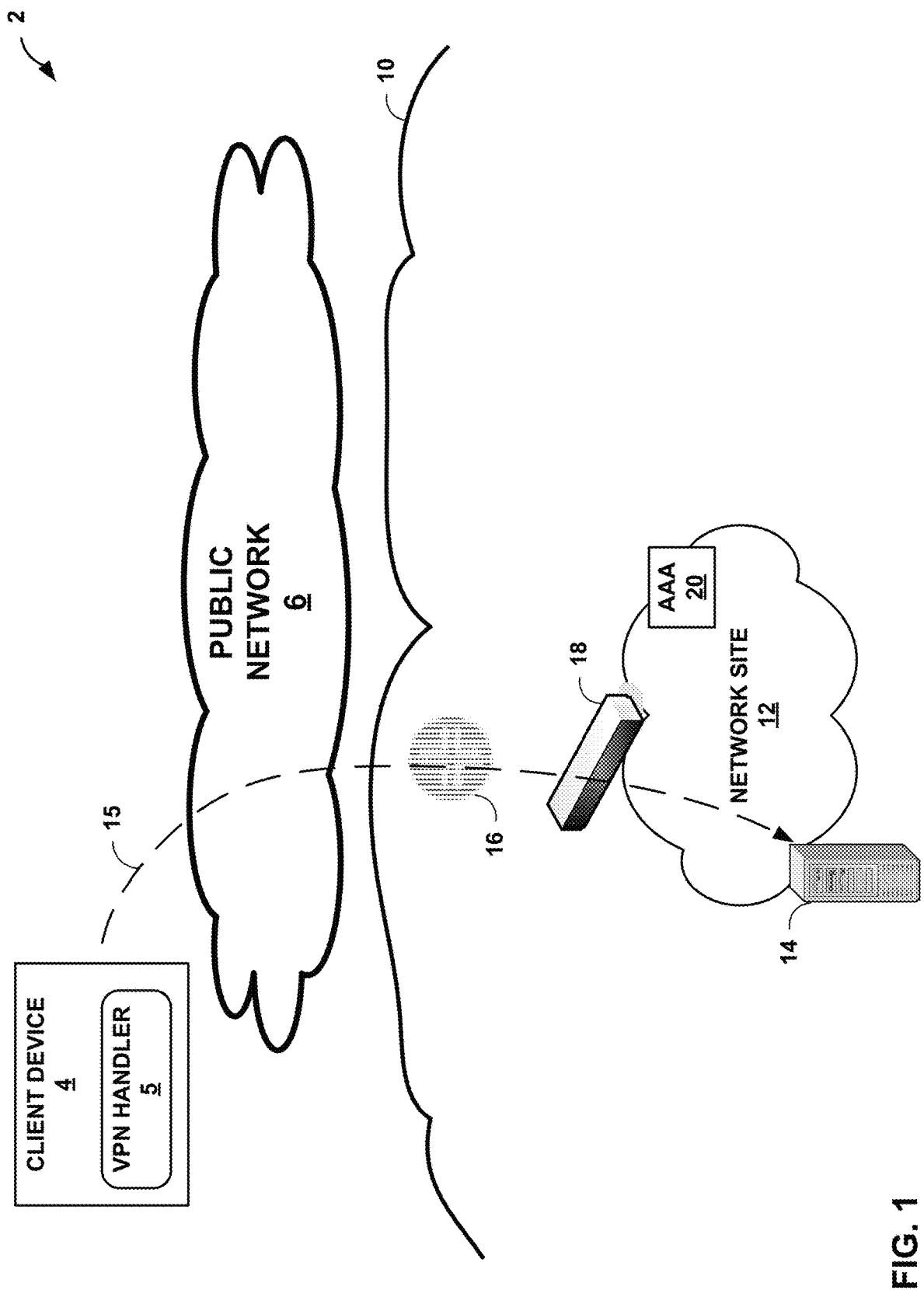
FIG. 1 is a conceptual diagram illustrating an example network system in which techniques described herein may be implemented.

FIG. 1 is a conceptual diagram illustrating an example network system 2 in which techniques described herein may be implemented. In the example of FIG. 1, network system 2 includes client device 4 that is configured to communicate over public network 6 to access enterprise network 10. Enterprise network 10 includes network site 12, which in turn provides access to one or more resources 14.

More specifically, to access resources 14 within enterprise network 10, client device 4 is configured to establish secure data connection 15 to virtual private network (VPN) concentrator 18. Client device 4 and VPN concentrator 18 may communicate over secure data connection 15 through router 16. In the implementation of network system 2 illustrated in FIG. 1, router 16 is positioned between client device 4 and VPN concentrator 18, to enable communication over secure data connection 15. In some implementations, VPN concentrator 18 is connected by a secure cross connection to other VPN concentrators deployed within enterprise network 10, so as to provide connectivity between network site 12 and other network sites within enterprise network 10. That is, VPN concentrator 18 may be one of a plurality of VPN concentrators that are deployed by the enterprise to provide secure access to the enterprise resources via public network 6.

VPN concentrator 18 operates as an endpoint for secure connection 15 with client device 4 and, in some cases, relays communications between secure connection 15 and other secure connections. Example details on secure sockets layer (SSL) VPN appliances and operations can be found in "Juniper Networks Secure Access Administration Guide, Release 6.5," Juniper Networks, Inc., 2008, which is incorporated herein by reference in its entirety. In other examples, VPN concentrator 18 may be incorporated within other devices, such as one or more of an intrusion detection and prevention (IDP) system, firewall, unified threat management (UTM) device, router, or other network device.

In general, client device 4 may be a personal computer or mobile device associated with an individual employee. Client device 4 may include, be, or be part of a variety of devices, such as a desktop computer, laptop computer, netbook, ultrabook, mobile phone (including so-called "smartphones"), a personal digital assistant ("PDA"), videogame console, television set-top box, watch, and/or an application running thereon (e.g., a web browser), among others. In order to access data and services provided by resources 14, client device 4 invokes VPN handler 5 that authenticates to VPN concentrator 18 and establishes a secure communication channel through public network 6 to VPN concentrator 18. In this sense, VPN concentrator 18 is the "local" VPN concentrator 18 for client device 4 and provides access to resources 14 typically used by the client device, such as a home page for a user of the device, email services for the user, and the like. In general, resources 14 may include web servers, application servers, database servers, file servers, software applications or web services, or any other electronic and/or computing resource.

To access resources 14 deployed within enterprise network 10, client device 4 establishes a secure data connection 15 to VPN concentrator 18. VPN handler 5 provides all low-level communication handling for access to enterprise network 10 via secure data connection 15. In one example, VPN handler 5 handles interaction and authentication to VPN concentrator 18, establishment and deconstructing of a secure data connection conforming to a security scheme, formation of encrypted outbound packets to be tunneled, and processing of inbound packets to decrypt those packets received from the tunnel.

Secure data connection 15, in some examples, comprises a secure data connection conforming to a security scheme, such as SSL, or Internet Protocol Security (IPSec) protocols. That is, an SSL VPN may be used to tunnel IP packets on top of a Layer 4 connection oriented protocol, e.g., Transmission Control Protocol (TCP). Alternatively, an IPSec VPN may be established to tunnel encrypted IP packets, i.e., Encapsulation Security Payload (ESP) packets, on top of a connection-less protocol, e.g., IP or User Datagram Protocol (UDP).

In either case, VPN concentrator 18 may require one or more user credentials to establish authentication and authorization. Some non-limiting examples of such credentials include one or more of a username-password pair, a biometric identifier, data stored on a smart card, a one-time password token, and a digital certificate. In some instances, VPN handler 5 presents an interface, such as a login page, for receiving credentials from the user. For SSL-VPNs, when accessing enterprise network 10, a user associated with client device 4 may direct a web browser executing on the client device to a Uniform Resource Locator (URL) associated with the enterprise. In this case, VPN concentrator 18 presents a web page on the endpoint computing device via the web browser to capture the credentials required from the user. Based on the provided credentials, VPN concentrator 18 either authorizes or denies access to enterprise network 10. In some examples, VPN concentrator 18 communicates with authentication, authorization and accounting (AAA) server 20 to authenticate the credentials. AAA server 20, in various implementations, executes on VPN concentrator 18, or on a separate network device and may be, for example, a Remote Authentication Dial-In User Service (RADIUS) server. VPN concentrator 18 and remote client device 4, in some examples, also negotiate other data connection aspects that ensure security, including the type/version of an encryption algorithm, and symmetric keys for encrypting/decryption data transported via secure data connection 15.

In accordance with the techniques described herein, VPN handler 5 enables client device 4 to interact with VPN concentrator 18 to access enterprise resources 14 over enterprise network 10. More specifically, VPN handler automatically manages interactions between client device 4 and VPN concentrator 18, such as by establishing secure data connection 15 in response to detecting certain conditions. For example, if VPN handler 5 detects one or more conditions under which client device 4 may require VPN connectivity to access enterprise resources 14, then VPN handler 5 provides the VPN connectivity by automatically creating a VPN tunnel such as secure data connection 15. As one example, VPN handler 5 detects that an internet protocol (IP) address assigned to client device 4, such as an IP address with respect to public network 6, indicates that client device 4 is positioned externally to enterprise network 10. In this example, VPN handler 5 automatically establishes secure data connection 15, thereby enabling the user of client device 4 to access enterprise resources 14.

In various scenarios, client device 4 and VPN concentrator 18 communicate over secure data connection 15 by implementing one or more security measures. Examples of security measures that client device 4 and/or VPN concentrator 18 may be configured to implement with respect to secure data connection 15 include encryption, encapsulation (e.g., in accordance with IPSec protocol), message integrity verification, tunneling (e.g., in accordance with the Layer 2 Tunneling protocol), and others. In turn, upon receiving data communicated over secure data connection 15, client device 4 and/or VPN concentrator 18 may perform corresponding security-based processes, such as decryption (e.g., using a shared key or key generation algorithm) de-encapsulation, etc.

Additionally, VPN handler 5 may be enhanced in accordance with one or more aspects of this disclosure, to automatically establish secure data connection 15 in a more efficient manner than the traditional, or "coarse-grained" methods described above. More specifically, according to the enhancements described herein, VPN handler 5 is configured to detect scenarios in which the user of client device 4 is likely using client device 4 in a manner that does not require access to enterprise resources 14. As examples, the user may use client device 4 to browse the Internet, or to access only documents and resources that are available from a local storage device of client device 4.

In such scenarios, the user utilizes client device 4 at a location external to enterprise network 10, but does not require any of the functionality provided by secure data connection 15. In fact, in these scenarios, the automatic establishment and execution of secure data connection 15 may hinder the functioning of client device 4, such as through unnecessary expenditure of computing resources. Additionally, if client device 4 accesses network resources, such as through Internet browsing, all network traffic generated and elicited by client device 4 may be tunneled through secure data connection 15, potentially leading to traffic congestion and inefficient bandwidth utilization. As a result, secure data connection 15 may lead to a diminished user experience with respect to client device 4, in situations where the user of client device 4 does not require secure data connection 15.

To alleviate these potential issues associated with automatically establishing secure data connection 15, VPN handler 5 is configured to implement one or more techniques described herein. More specifically, VPN handler 5 is configured to determine, in a granular, or "fine-grained" manner, whether to establish secure data connection 15. For instance, VPN handler 5 may monitor activity of client device 4 at application level, and establish secure data connection 15 only in response to detecting particular conditions that suggest that the user requires access to enterprise resources 14. More specifically, in some examples, VPN handler 5 monitors actions initiated by applications installed on client device 4. As one example, VPN handler 5 detects that the user has invoked, at client device 4, an email client application configured to access an email account provided by an enterprise email server of enterprise resources 14. In this example, VPN handler 5 establishes secure data connection 15 in response to detecting that the email client application is invoked. In some implementations, VPN handler 5 optionally deactivates secure data connection 15 in response to detecting that all applications requiring access to enterprise resources 14 have been shut down. In the scenario described above, provided that the user does not subsequently invoke any other applications at client device 4 that require access to enterprise resources 14, VPN handler 5 may deactivate secure data connection 15 in response to detecting that the email client application has been shut down.

In some implementations, VPN handler 5 is configured to implement the techniques of this disclosure in an even more granular fashion than the examples described above. More specifically, VPN handler 5 may monitor actions initiated within the context of an application, and determine whether to establish secure data connection 15 based on particular initiated actions. In one example, VPN handler 5 monitors uniform resource locators (URLs) accessed through a web browser executing at client device 4. In this example, if VPN handler 5 detects a request to access a URL hosted by resources 14, such as an enterprise intraweb, then VPN handler 5 automatically establishes secure data connection 15. In this manner, VPN handler 5 may implement the techniques of this disclosure in a variety of ways to more efficiently establish secure data connection 15 in appropriate situations, and determine not to establish secure data connection 15 in situations where secure data connection 15 is not required, as the case may be.

In examples where VPN handler 5 establishes and maintains secure data connection 15, client device 4 communicates over secure data connection 15 in accordance with one or more of the security measures described above, such as by encrypting and/or encapsulating outbound traffic, and by decrypting and/or de-encapsulating incoming traffic. According to some implementations of the techniques of this disclosure, client device 4 is configured to partition outbound traffic, by determining whether or not VPN handler 5 determines that particular portions of the traffic solicit access to enterprise resources 14. In other words, according to these implementations, VPN handler 5 determines which portions of the outbound traffic are dependent on secure data connection 15, and conversely, which portions of the outbound traffic may be transmitted independently of secure data connection 15. The partitioned portions of the outbound traffic are referred to herein as VPN-dependent, and VPN-independent, respectively.

According to these implementations, client device 4 is configured to, in turn, transmit the VPN-dependent traffic over secure data connection 15, and transmit the VPN-independent traffic over any data connection to which client device 4 is coupled. In this manner, according to certain examples of this disclosure, client device 4 is configured to implement the techniques in targeted fashion. More specifically, according to these examples, client device 4 applies the security features of secure data connection 15 to VPN-dependent traffic. Additionally, according to these examples, client device 4 does not route VPN-independent traffic through secure data connection 15, thereby conserving computing resources that client device 4 would otherwise expend to encrypt or encapsulate the VPN-independent traffic, and conserving the bandwidth available via secure data connection 15.

In some examples, VPN handler 5 implements rules locally at client device 4, where the rules specify one or more application-layer activities/actions, or conditions under which to establish secure data connection 15. In other examples, VPN handler 5 may receive one or more of the rules from a device positioned within enterprise network 10, such as one or more of router 16, VPN concentrator 18, enterprise resources 14, and AAA 20. As one example, router 16 may store such rules (which may be configured on router 16 by a network administrator, for example), and router 16 may periodically transmit or "push" the rules to client device 4 to be stored at client device 4 for implementation by VPN handler 5. In some examples, VPN handler 5 stores some rules locally, and receives other rules from a device positioned within enterprise network 10. In other words, the techniques described herein may be implemented at one or more devices, sometimes in a distributed manner, thereby leveraging existing network architecture and hardware resources.

Figure 2:
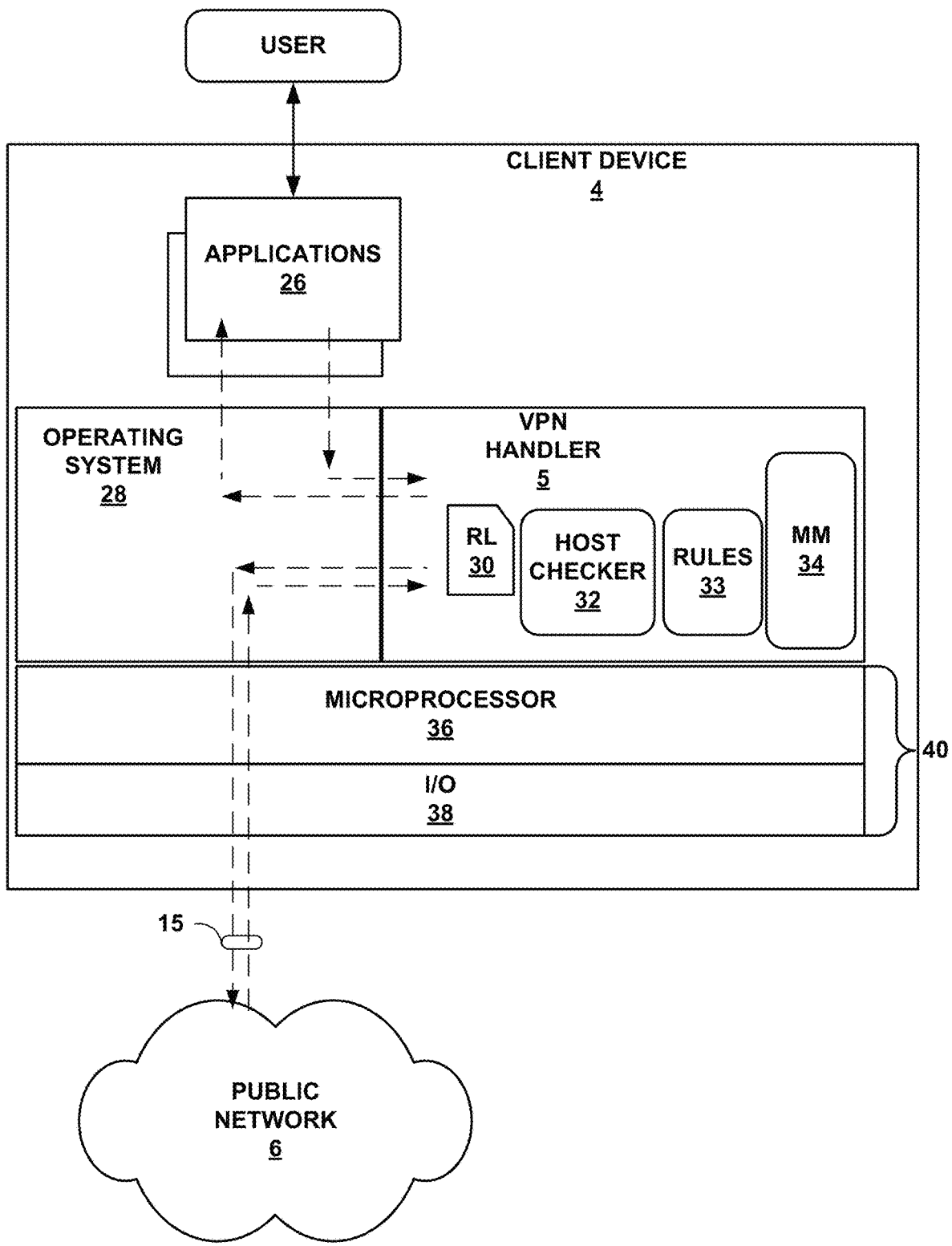
FIG. 2 is a block diagram illustrating an example implementation of a client device that operates in accordance with the techniques described herein.

FIG. 2 is a block diagram illustrating an example implementation of client device 4 that operates in accordance with the techniques described herein. In the example of FIG. 2, client device 4 includes hardware 40 that provides one or more core functionalities for operation of client device 4. Hardware 40, in the implementation illustrated in FIG. 2, includes one or more programmable microprocessors 36 configured to operate according to executable instructions (i.e., program code), often stored in a computer-readable medium such as a static, random-access memory (SRAM) device or a Flash memory device. I/O 38 provides a network interface for communicating with public network 6. The network interface provided by I/O 38 may include, be, or be part of a wired or wireless interface, such as an Ethernet, fiber optic, token ring, modem, or other network interface. Hardware 40 may also include additional discrete digital logic or analog circuitry.

Operating system 28 executes on microprocessor 36 and provides an operating environment for one or more applications (commonly referred to as "apps"). In one example, operating system 28 provides an interface layer of for receiving kernel calls from applications 26. In addition, operating system 28 provides a framework within which VPN handler 5 operates and, in some examples, allows VPN handler 5 to execute within a "user" space of the operating environment provided by client device 4. Operating system 28 may provide access to lower levels of the OSI stack for routing inbound and/or outbound packets over secure data connection 15, ensuring that Domain Name System (DNS) resolvers are set correctly for the VPN, and the like. In the example of FIG. 2, operating system 28 routes inbound and outbound communications to VPN handler 5 for processing. VPN handler 5 may register with operating system 28 to provide a single point of entry for network traffic so as to transparently apply VPN services to the network traffic.

As illustrated in FIG. 2, VPN handler 5 stores resource list (RL) 30 received from VPN concentrator 18. Resource list 30 may take the form of a file, database, data structure or other repository for storing information describing the reachability of resources 14 through VPN concentrator 18 of the enterprise. In some implementations, VPN handler 5 creates a security associate (SA) for encrypting outbound communications for secure data connection 15. In the event that VPN handler 5 detects an outbound communication for any non-local resources, such as resources 14, then VPN handler 5 utilizes resource list 30 to identify VPN concentrator 18 for establishing a VPN tunnel. Additionally, in this scenario, VPN handler 5 automatically creates secure data connection 15 to provide direct access to VPN concentrator 18B, and in turn, to various systems positioned at network site 12, such as resources 14. In the example of FIG. 2, VPN handler 5 includes management module ("MM") 34 that communicates with VPN concentrator 18, such as by way of a dedicated socket, to receive updated resource lists.

In the example implementation illustrated in FIG. 2, VPN handler 5 also includes host checker 32. Host checker 32 is configured or otherwise operable to monitor conditions associated with the functioning of client device 4. More specifically, VPN handler 5 uses host checker 32 to determine whether client device 4 meets certain parameters to be eligible to connect to VPN concentrator 18 via secure data connection 15. As one example, VPN handler 5 uses host checker 32 to inventory a state of client device 4, build a health status report, and pass the health status report to router 16 at the time of login for processing and determination as to whether client device 4 is compliant with corporate policies set by the enterprise. For example, VPN handler 5 collects and forwards up-to-date "health information" to router 16 at or about the time that VPN handler 5 requests establishment of secure data connection 15.

In general, the term "health information" is used herein to generally refer to data that describes a security state of client device 4. For example, the health information may describe whether the specific endpoint device (client device 4 in this example) contains potentially malicious software (e.g. a known virus or spyware), whether the endpoint device has invalid configuration, or whether approved countermeasures (e.g., antivirus software) have been properly installed on the endpoint device. In some cases, router 16 may prevent access or allow limited access based on both the current health information of client device 4, and/or the particular user that requests the establishment of secure data connection 15 using client device 4. In other words, host checker 32 may furnish health information regarding one or both of the presence (or execution) of required software, and the absence (or inactive status) of impermissible software for the establishment of secure data connection 15. Further details of such techniques for controlling access based on health information of a mobile device can be found in U.S. patent application Ser. No. 11/236,987, Filed Sep. 28, 2005, entitled NETWORK DEFENSE SYSTEM UTILIZING ENDPOINT HEALTH INDICATORS AND USER IDENTITY," the entire contents of which are incorporated herein by reference.

By implementing various techniques of this disclosure, one or both of VPN handler 5 and host checker 32 may selectively and more efficiently determine conditions under which to automatically establish, or attempt to establish, secure data connection 15. As described, according to some traditional implementations, host checker 32 is configured to monitor for the installation status and/or execution status of particular software on client device 4, such as software provided by one or more of applications 26. According to one or more of the techniques described herein, VPN handler 5 is enhanced, enabling VPN handler 5 to leverage the functionalities of host checker 32, to detect conditions under which to establish secure data connection 15.

In one example, VPN handler 5 is configured to automatically invoke host checker 32, upon detecting that client device 4 is at a remote location, such as at a location that is external to enterprise network 10. More specifically, VPN handler 5 may detect that client device 4 is at the remote location using one or more criteria, such as an IP address assigned to client device 4, a service set identifier (SSID) detected by I/O 38 with respect to a proximate wireless access point, global positioning system (GPS) coordinates of client device 4, and others. In other examples, VPN handler 5 is configured to execute host checker 32 at all times that VPN handler 5 is executing. In these examples, VPN handler 5 may execute host checker 32 at all times, and, at the appropriate junctures, utilize host checker 32 to implement the selective VPN establishment techniques of this disclosure.

In the example implementation of client device 4 illustrated in FIG. 2, VPN handler 5 also includes one or more rules 33. In various examples, one or more of rules 33 specify one or more application-layer actions or conditions under which to establish secure data connection 15. In other examples, VPN handler 5 may receive one or more of rules 33 from a device positioned within enterprise network 10, such as one or more of router 16, VPN concentrator 18, enterprise resources 14, and AAA 20. As one example, router 16 may periodically transmit or "push" one or more of rules 33 to VPN handler 5 of client device 4. In some examples, rules 33 represent a subset of rules implemented by VPN handler 5. In these examples, in addition to locally-stored rules 33, VPN handler 5 may receive other rules from another device. In other words, VPN handler 5 may implement rules 33 in conjunction with additional rules that are available from external sources, to implement the techniques of this disclosure in a distributed manner, thereby leveraging existing network architecture and hardware resources.

A potential advantage of the example implementations described above is that VPN handler 5 can avail of existing hardware and software infrastructure provided by client device 4 to implement the selective VPN establishment techniques described herein. For instance, according to these implementations, VPN handler 5 leverages functionalities that are traditionally implemented by host checker 32, such as monitoring for the installation status and execution status of particular software at client device 4. More specifically, VPN handler 5 is configured to apply these functionalities of host checker 32 to detect conditions under which establishing secure data connection 15 is warranted. Optionally, VPN handler 5 is configured to invoke host checker 32 based on particular conditions under which the establishment of secure data connection 15 may possibly be warranted.

According to some example implementations of the granular VPN establishment techniques described herein, application-level rules can be configured in combination with network-based rules, such as existing network-based rules to which client device 4 conforms. For example, rules 33 may specify that if VPN handler 5 determines that client device 4 is at a remote location, host checker 32 shall monitor for the activation, or initial execution, of one or more of applications 26. Based on detecting activation of the particular one or more of applications 26, in accordance with rules 33, host checker 32 causes VPN handler 5 to establish secure data connection 15. In one example, host checker 32 monitors for the activation, or initial execution, of an email client of applications 26, where the email client is linked to an enterprise email account administered via resources 14.

If host checker 32 detects that an email client of applications 26 is invoked, and that the invoked email client is linked to an enterprise email account, host checker 32 causes VPN handler 5 to establish secure data connection 15. More specifically, if host checker 32 detects that a user has activated the email client linked to the enterprise email account, then host checker 32 determines based on rules 33 that any network traffic transmitted or received using the email client warrants the security features provided by secure data connection 15. In turn, host checker 32 causes VPN handler 5 to establish secure data connection 15, thereby enabling VPN handler 5 to transmit and receive traffic related to the enterprise email account over secure data connection 15. More specifically, VPN handler 5 may transmit and receive the enterprise email-related traffic in secure forms, such as encapsulated and/or encrypted formats.

In accordance with one or more examples of fine-grained implementations, host checker 32 monitors for activation-level activity of one or more of applications 26. As one example, host checker 32 monitors for one or more application-level parameters passed in communications by one or more of applications 26, to determine an activation event with respect to the particular application 26. One example of an application-level parameter that host checker 32 may use to detect activation is a name of an application that is activated. Another example of an application-level parameter that host checker 32 may use to detect activation is a command-line parameter, such as a "start" command. Host checker may monitor the application-level parameters (e.g., in application-layer communications), and apply one or more of rules 33 to determine when to initiate and/or terminate secure data connection 15, e.g., based on the rules 33.

Additionally, according to some example fine-grained implementations described herein, host checker 32 is configured to determine the particular applications 26 that might require the access and/or security features provided by secure data connection 15. In one example, host checker 32 maintains a list of those of applications 26 determined to possibly require the access and/or security features provided by secure data connection 15. Such a predetermined list maintained by host checker 32 is referred to herein as a "whitelist." Examples of applications 26 that may be included in a whitelist are an email client linked to an enterprise email account, an enterprise time-tracking application, and enterprise-internal instant messaging (IM) application. The whitelist may be specified and/or maintained as part of one or more of rules 33.

In accordance with even more granular, or finer-grained, example implementations, host checker 32 is configured to monitor for particular actions initiated within the context of an active application of applications 26, and based on detecting a particular initiated action, cause VPN handler 5 to establish secure data connection 15. For example, host checker 32 may inspect packets generated by client device 4 to be output from client device 4, and may examine application-layer information of the packets. In some aspects, host checker 32 may examine information in the header of one or more packets, and/or may examine information in the payload of one or more packets. In some instances, host checker 32 monitors for particular initiated actions within the context of a web browser provided by applications 26.

According to some example finer-grained implementations, host checker 32 is configured to monitor for particular URLs that may possibly warrant access to resources 14. If host checker 32 detects, based on this application-layer inspection, that a user is attempting to access such a URL using the web browser, host checker 32 is configured to cause VPN handler 5 to establish secure data connection 15. As one example, host checker 32 is configured to monitor web browser activity for any attempts to access an enterprise intraweb hosted at resources 14.

Based on detecting any attempt to access the enterprise intraweb via the web browser, host checker 32 may cause VPN handler 5 to establish secure data connection 15. More specifically, if host checker 32 detects that a user is attempting to access the enterprise intraweb from a remote location, then host checker 32 determines that some or all of the network traffic transmitted or received using the web browser warrants the security features provided by secure data connection 15. In turn, host checker 32 causes VPN handler 5 to establish secure data connection 15, thereby enabling VPN handler 5 to transmit and receive traffic related to the web browser. Similarly to the descriptions above with respect to other examples, VPN handler 5 may transmit and receive the browser-related traffic in secure forms, such as encapsulated and/or encrypted formats.

In some examples of finer-grained monitoring as described herein, host checker 32 monitors for particular actions initiated within the context of the use of each of the whitelisted applications of applications 26. In one scenario, host checker 32 maintains a second whitelist, which includes a listing of certain URLs accessible via a web browser of applications 26. The URL whitelist may include one or more enterprise-related URLs, such as URLs that reference certain enterprise-related resources, such as one or more of resources 14. Examples of enterprise-related URLs that host checker 32 may include in the URL whitelist include an enterprise intraweb URL, a remote webmail address for an enterprise email account, and a web interface for the enterprise-internal IM application. In this manner, host checker 32 is configured to implement varying levels of granularity with respect to monitoring for actions related to applications 26 that might warrant establishing secure data connection 15.

According to some example implementations of the techniques described herein, host checker 32 may be configured to determine, while secure data connection 15 is active, whether any of applications 26 that possibly require the use of secure data connection 15 are still active. In other words, host checker 32 determines whether secure data connection 15 is still required, based on the particular applications 26 that are currently active. If host checker 32 determines that none of applications 26 that require secure data connection 15 are currently active, host checker 32 may cause VPN handler 5 to deactivate secure data connection 15. In some examples, host checker 32 may be configured to periodically check whether the applications 26 using secure data connection 15 are still active, such as by checking for active status at configured time intervals.

In one such implementation, host checker 32 may be configured to implement a counter to track the activation status of particular applications 26 that possibly require secure data connection 15. More specifically, according to this implementation, host checker 32 is configured to increment the counter at each instance that host checker 32 detects activation-type actions initiated by applications 26 that possibly require secure data connection 15. Applying the examples described above, host checker 32 increments the counter once upon detecting that the email client is activated, and increments the counter a second time upon detecting that a user is attempting to access the enterprise intraweb via the web browser.

Conversely, host checker 32 may be configured to decrement the counter at each instance that host checker 32 detects deactivation-type actions initiated by applications 26 that possibly require secure data connection 15. Applying the examples described above, host checker 32 decrements the counter once upon detecting that the email client is deactivated, and decrements the counter a second time upon detecting that a user has navigated away from the enterprise intraweb, using the web browser. If host checker 32 determines that the counter has reached a zero value, and that secure data connection 15 is still active, host checker 32 may cause VPN handler 5 to deactivate secure data connection 15.

More specifically, host checker 32 may determine, based on the zero value of the counter, that no component of client device 4 still requires secure data connection 15. In one example, host checker 32 is configured to embed a time delay (e.g., for a predetermined or dynamically-determined interval of time) after detecting that the counter has reached the zero value, before causing VPN handler 5 to deactivate secure data connection 15. By embedding the time delay, host checker 32 may enable a user of client device 4 to initiate or perform new actions that require secure data connection 15, or restart recently-closed or recently-terminated actions that require secure data connection 15, without expending the computing resources of deactivating and reviving secure data connection 15.

In other examples, VPN handler 5 is configured to determine whether or not to establish secure data connection 15, independently of the functionalities described above with respect to host checker 32. More specifically, according to these examples, other components of client device 4 are configured to provide VPN handler 5 with indications, such as notifications, of particular types of initiated actions. VPN handler 5 may, in turn, use the received action indications to determine whether or not to establish secure data connection 15. Such implementations of the techniques of this disclosure are referred to herein as "host checker-independent" implementations.

According to one example host checker-independent implementation, operating system 28 is configured to pass application identifiers to VPN handler 5, to indicate particular application-level actions or activities. More specifically, in this example, operating system 28 is configured to pass an identifier associated with each invoked application of applications 26 to VPN handler 5. For instance, operating system 28 may receive a "load" or "execute" system call from one of applications 26 that a user is attempting to invoke. In examples, the load or execute system calls indicate an initial execution of the corresponding application. In turn, operating system 28 may generate an identifier associated with the corresponding application 26, and provide the generated identifier to VPN handler 5.

If the identifier is associated with an application 26 that possibly warrants the access and/or security features of secure data connection 15, VPN handler 5 can establish secure data connection 15. As one example, if VPN handler 5 receives an identifier associated with the email client linked to the enterprise email account, VPN handler 5 establishes secure data connection 15. In this manner, operating system 28 is configured to provide VPN handler 5 with an indication of each of applications 26 that a user attempts to activate, thereby enabling VPN handler 5 to determine whether to establish secure data connection 15.

According to other example host checker-independent implementations, operating system 28 is configured to determine which of applications 26 might warrant the access and/or security features of secure data connection 15. In accordance with such implementations, operating system 28 provides provide VPN handler 5 with corresponding application identifiers only when operating system 28 receives a load or execute system calls from such applications of applications 26. In other words, according to these particular host checker-independent implementations, operating system 28 is configured to "filter" the identifiers, and pass, or relay, only those identifiers that possibly warrant the establishment of secure data connection 15 to VPN handler 5.

According to such example host checker-independent implementations, VPN handler 5 is, in turn, configured to establish secure data connection 15, in response to receiving an application identifier that is filtered and sent, or relayed, by operating system 28. More specifically, in these particular host checker-independent implementations, VPN handler 5 does not determine whether a particular identifier is associated with an application 26 that may require the features of secure data connection 15. Instead, operating system 28 is configured to determine whether an application 26 being invoked might warrant the security features provided by secure data connection 15, and only if such an application 26 is invoked, provide an application identifier to VPN handler 5. In turn, VPN handler 5 uses the results of the filtering process performed by operating system 28, to determine that all received identifiers are associated with applications 26 that warrant the features of secure data connection 15, and in response, establishes secure data connection 15. In this manner, various functionalities described herein may be distributed differently among components of a computing device, such as client device 4, configured to implement the techniques of this disclosure.

In some host checker-independent implementations, operating system 28 and/or VPN handler 5 are configured to determine whether all previously-invoked applications 26 that may require the access and/or security features of secure data connection 15 have been deactivated. According to these examples, operating system 28 is configured to provide one or more indications to VPN handler 5, with respect to the deactivation of one or more of applications 26. If, based on the received deactivation indications, VPN handler 5 determines that no active application of active applications 26 warrants the various features of secure data connection 15, then VPN handler 5 deactivates secure data connection 15.

In some such implementations, operating system 28 receives a "terminate process" or "kill" system call from a currently-running application 26. In one example, operating system 28 generates an indication of each terminate process system call, and passes each indication to VPN handler 5. According to this example, VPN handler 5, in turn, uses each received indication to decrement a counter of active applications 26 that may require secure data connection 15 to be active. If VPN handler 5 determines that the counter has reached a zero value, VPN handler 5 may deactivate secure data connection 15.

In another such example, operating system 28 is configured to maintain a counter of currently-running applications 26 that may require the security features of secure data connection 15. More specifically, in this example, operating system 28 is configured to increment the counter for each received "load" system call, and decrement the counter for each received "kill" system call. For instance, operating system 28 may increment and decrement the counter using load and kill system calls associated with particular applications 26 that operating system 28 determines may warrant one or more features of secure data connection 15. If operating system 28 determines that the counter has reached a value of zero, operating system 28 passes an indicator of the zero value to VPN handler 5. In turn, VPN handler 5 may deactivate secure data connection 15.

In the examples described above with respect to selective deactivation of secure data connection 15, VPN handler 5, operating system 28, and other components of client device 4 are configured to determine conditions under which secure data connection 15 is currently active, but may no longer be required. In response to determining that secure data connection 15 may no longer be required, VPN handler 5 is configured to deactivate secure data connection 15.

These example host checker-dependent and host checker-independent implementations of the techniques described herein may provide one or more potential advantages. For instance, VPN handler 5 may conserve computing resources and bandwidth consumption by terminating secure data connection 15 in scenarios where secure data connection 15 is not required, while utilizing the security features of secure data connection 15 in scenarios where the security features may be required. In this manner, the selective VPN deactivation techniques of this disclosure enable client device 4 to more efficiently exploit computing resources and available bandwidth, while not compromising security concerns with respect to various VPN-dependent applications of applications 26.

In some example implementations of the selective VPN techniques described herein, VPN handler 5 is configured to partition outgoing traffic, and tunnel a subset of the outgoing data traffic through secure data connection 15. According to these implementations, VPN handler 5 is configured to transmit the remainder of the outgoing traffic over the connection to public network 6, without tunneling any of the remaining traffic through secure data connection 15. It will be appreciated that VPN handler 5 may tunnel portions of the remaining traffic through secure data connections, such as VPNs, other than secure data connection 15, which, for ease of illustration purposes only, are not illustrated in FIG. 1.

As one example, VPN handler 5 is configured to identify and isolate outgoing traffic generated by those of applications 26 that are included in the whitelist. In turn, VPN handler 5 uses secure data connection 15 to tunnel the outgoing traffic generated by the whitelisted applications 26 for transmission. In some scenarios, VPN handler 5 may maintain multiple whitelists, each corresponding to a different secure data connection. Under such circumstances, VPN handler 5 partitions the outgoing traffic for all whitelisted applications 26, to correspond to each specific whitelist. In turn, VPN handler 5 tunnels outgoing traffic from each whitelisted application 26, over the corresponding secure data connection.

Conversely, if VPN handler 5 determines that a portion of the outgoing data traffic is not generated by any whitelisted application 26, VPN handler 5 transmits the portion of the outgoing data traffic over public network 6, without tunneling the portion over any secure data connection associated with client device 4. In other words, if VPN handler 5 determines that particular outbound data does not require the access and/or security features of secure data connection 15, VPN handler 5 transmits the particular outbound data over public network 6, without any additional enhancements with respect to resource-access or network security.

By partitioning the outbound traffic in the manner described, VPN handler 5 may offer one or more potential advantages. For instance, VPN handler 5 may avail of the features of secure data connection 15 with respect to the particular outbound traffic that potentially requires secure data connection 15. In conjunction, VPN handler 5 may conserve computing resources and bandwidth consumption that VPN handler 5 by routing VPN-independent outbound traffic over public network 6. More specifically, if VPN handler 5 were configured to tunnel all outbound traffic through secure data connection 15, VPN handler 5 would expend computing resources to prepare all outbound data (e.g., by encapsulation, encryption, etc.), and consume bandwidth over secure data connection 15 that is commensurate to the entire amount of outbound data traffic. On the other hand, by implementing the traffic partitioning techniques described herein, VPN handler 5 may utilize the features of secure data connection 15 with respect to the particular outbound traffic that potentially requires secure data connection 15, while conserving computing resources and bandwidth by routing VPN-independent traffic over public network 6.

In some examples of the techniques described herein, VPN handler 5 is configured to implement corollary rules to the selective VPN establishment rules described above. For instance, VPN handler 5 may implement corollary rules that disallow, or terminate, secure data connection 15, based on the launch of one or more of applications 12. As one example, VPN handler 5 may "blacklist" one or more of applications 12, with respect to secure data connection 15. More specifically, if secure data connection 15 is active, and VPN handler 5 detects activation of a blacklisted application of applications 12, VPN handler 5 may deactivate or disconnect from secure data connection 15. In this manner, VPN handler 5 may extend the techniques of this disclosure to detect conditions under which to deactivate secure data connection 15.

Figure 3:
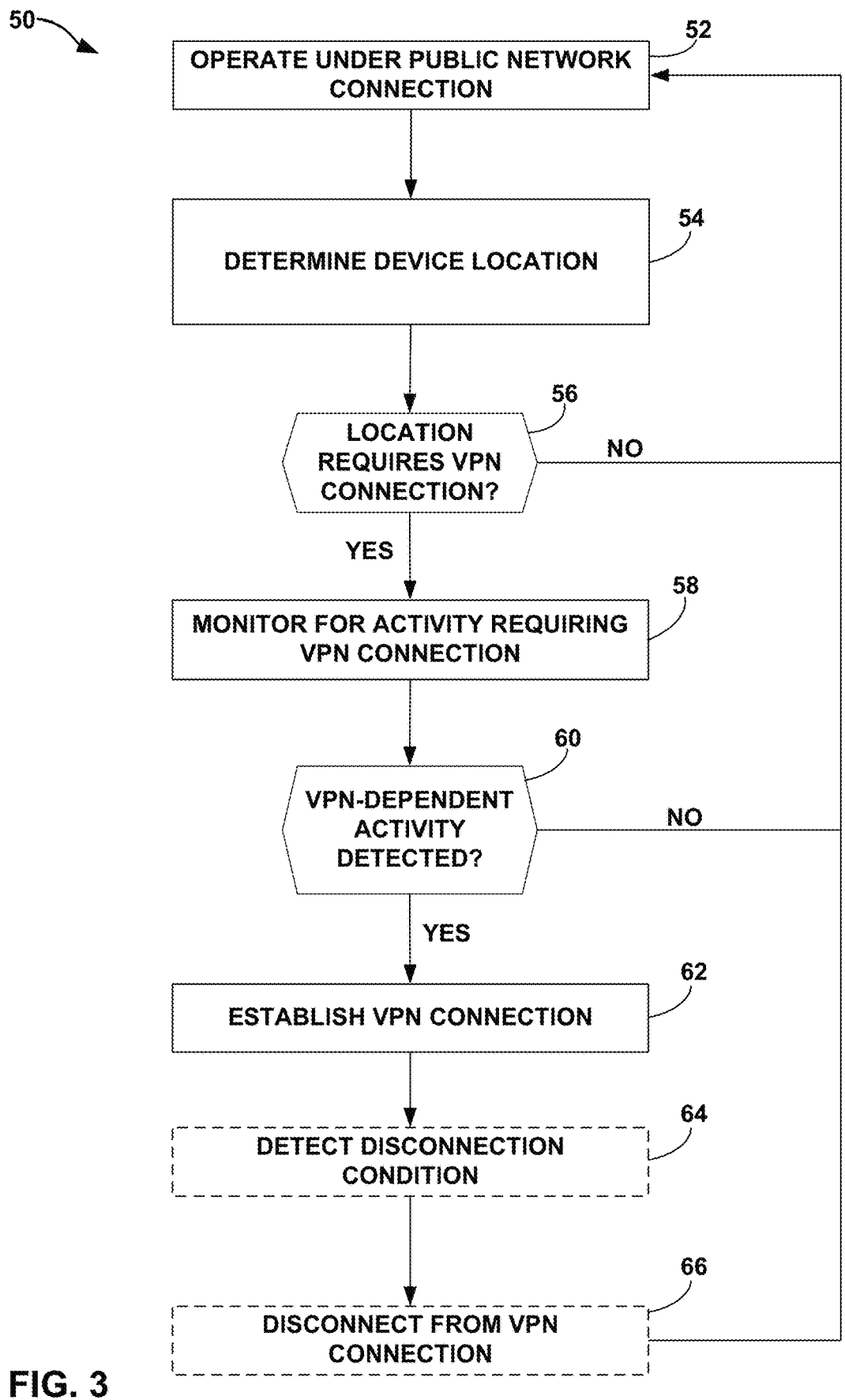
FIG. 3 is a flowchart illustrating an example process by which a computing device, performs one or more of the selective VPN establishment techniques of this disclosure.

FIG. 3 is a flowchart illustrating an example process 50 by which a computing device, such as client device 4 of FIGS. 1 and 2, performs one or more of the selective VPN establishment techniques of this disclosure. Although process 50 may be performed by a variety of computing devices, for ease of discussion purposes only, process 50 is described herein with respect to client device 4 and various components and/or modules thereof. Process 50 begins with client device 4 operating under a connection to public network 6 (52). As described, a user of client device 4 may use client device 4 to access various resources over public network 6, such as publicly-available Internet resources, as well as enterprise resources in certain scenarios, such as resources 14 available via enterprise network 10.

VPN handler 5 determines the current location of client device 4 (54). More specifically, VPN handler 5 is configured to determine whether client device 4 is currently positioned, either physically or logically, within enterprise network 10. VPN handler 5 may determine the current location of client device 4 using various indicators and/or metrics, such as an IP address currently assigned to client device 4, the current GPS coordinates of client device 4, an SSID broadcast by a proximate wireless access point detected by I/O 38, and others.

Based on the determined location of client device 4, VPN handler 5 determines whether client device 4 requires the use of secure data connection 15 to access resources 14 (56). More specifically, VPN handler 5 determines whether the location of client device 4 is physically and/or logically within enterprise network 10. If VPN handler 5 determines that client device 4 does not require secure data connection 15 to access resources 14 (NO' branch of 56), VPN handler 5 causes client device 4 to continue to operate under the current connection to public network 6 (52). In other words, if VPN handler 5 determines that client device 4 is positioned within enterprise network 10, then VPN handler 5 determines that client device 4 has access to resources 14, with the requisite security features provided within enterprise network 10.

Conversely, if VPN handler 5 determines that client device 4 is positioned externally to enterprise network 10, then VPN handler 5 determines that client device 4 may require secure data connection 15 to access resources 14. If VPN handler 5 determines that client device 4 may require secure data connection 15 to access resources 14 (YES' branch of 56), then VPN handler 5 causes host checker 32 and/or operating system 28 to monitor for actions initiated at client device 4 that may require the use of secure data connection 15 (58). As described with respect to FIG. 2, one or both of host checker 32 and operating system 28 may monitor for actions initiated by applications 26 that possibly require the use of secure data connection 15. However, for the purpose of ease of discussion only, the monitoring aspects are described in the context of host checker 32, with respect to FIG. 3.

Host checker 32 is configured to determine, based on the action monitoring, whether host checker 32 detects any initiated action that suggests a need to establish secure data connection 15 (60). In some examples, as described above, host checker 32 maintains a counter of currently-running applications 26 that might require the access and/or security features provided by secure data connection 15. If host checker 32 determines that the counter remains at a zero value, host checker 32 does not detect any initiated action that possibly requires the features provided by secure data connection 15 (NO' branch of 60). In this scenario, VPN handler 5 causes client device 4 to continue to operate under the current connection to public network 6 (52).

Conversely, if host checker 32 detects a transition of the counter from a zero value to a value greater than zero, host checker 32 detects an initiated action that possibly requires secure data connection 15 (YES' branch of 60). More specifically, a transition of the counter from zero to a value greater than zero indicates that at least one of applications 26 that has been invoked might require secure data connection 15, or that a particular action initiated within the context of one of applications 26 might require secure data connection 15. In this manner, host checker 32 is configured to detect situations in which the execution state of client device 4 transitions from a state that does not require the features of secure data connection 15, to a state that might possibly require one or more features of secure data connection 15.

If host checker 32 detects an action initiated at client device 4 that potentially requires the use of secure data connection 15, host checker 32 causes VPN handler 5 to establish secure data connection 15 (62). More specifically, upon establishing secure data connection 15, VPN handler 5 routes, or "tunnels," some or all outgoing data traffic through secure data connection 15, such as through encryption, encapsulation, etc. Similarly, VPN handler 5 receives some or all incoming data traffic over secure data connection 15. VPN handler 5 may process the incoming data traffic from secure data connection 15 through decryption, de-encapsulation, etc.

In some examples, VPN handler 5 may optionally detect a disconnection condition with respect to secure data connection 15 (64). An example of a disconnection condition in one such optional scenario includes detecting, by VPN handler 5, that a counter maintained by host checker 32 has reached a zero value. More specifically, in this optional scenario, host checker 32 maintains a counter of currently-executing applications of applications 26 that potentially require the use of secure data connection 15. If VPN handler 5 detects that host checker 32 has decremented the counter to a zero value, VPN handler may determine that no currently-active application of applications 26 requires secure data connection 15.

According to these optional scenarios, if VPN handler 5 detects the disconnection condition, VPN handler 5 is configured to disconnect from (or deactivate) secure data connection 15 (66). In some examples, VPN handler 5 embeds a delay, or lag time, before disconnecting from secure data connection 15. More specifically, VPN handler 5 may use the delay to allow for activation or reactivation of additional applications of applications 26 that potentially require secure data connection 15. In scenarios where an application 26 that potentially requires secure data connection 15 is activated/reactivated within the delay time, VPN handler 5 may conserve computing resources that client device 4 would otherwise expend in disconnecting from secure data connection 15, only to reestablish secure data connection 15 within a relatively short period of time.

Various examples have been described. These and other examples are within the scope of the following claims.

What is claimed is:

1. A client device comprising:
    a memory configured to store a list of one or more uniform resource locators (URLs), each respective URL included in the list being predetermined to correspond with a protected resource of an enterprise network;
    one or more programmable processors coupled to the memory;
    a network interface device, coupled to the one or more programable processors, the network interface device being configured to couple the client device with a network;
    a virtual private network (VPN) handler coupled to the memory, to the one or more programmable processors, and to the network interface device, the VPN handler being configured to:
        monitor one or more application-layer communications output by a plurality of applications executable by the one or more processors;
        based on the monitored one or more application-layer communications, identify each attempt of one or more attempts, by the one or more application-layer communications, to access a first URL of the one or more URLs included in the list stored to the memory;
        prior to generating outbound data traffic associated with any of the one or more attempts to access the first URL of the one or more URLs included in the list stored to the memory, one of:
            establish a new secure VPN connection between the network interface device and a VPN concentrator associated with the enterprise network, or
            select an existing secure VPN connection between the network interface device and the VPN concentrator associated with the enterprise network;
        transmit, via the network interface device, first outbound data traffic associated with a first attempt of the one or more attempts to access the first URL included in the list over the one of the new secure VPN connection or the selected existing secure VPN connection;
        based on the monitored one or more application-layer communications, identify each attempt of one or more attempts, by the one or more application-layer communications, to access a second URL that is not included in the list stored to the memory;
        prior to generating second outbound data traffic associated with any of the one or more attempts to access the second URL that is not included in the list stored to the memory, one of:
            establish a new unsecure connection between the network interface device and a public network, or
            select an existing unsecure connection between the network interface device and the public network; and
        transmitting, while the secure VPN connection is active, the second outbound data traffic associated with the second URL that is not included in the list over the one of the new unsecure connection or the selected existing unsecure connection.

2. The client device of claim 1, wherein, to monitor the application-level communications output by the one or more applications, the VPN handler is configured to monitor system calls issued by the plurality of applications.

3. The client device of claim 1, wherein the one or more processors are configured to execute one or more operating systems configured to:
    receive the application-level communications from the plurality of applications;
    filter the received application-level parameters to obtain a subset of the received application-level parameters; and
    send each respective application-level parameter of the obtained subset to the VPN handler.

4. The client device of claim 1, wherein the protected resource is an enterprise intraweb of the enterprise network, and wherein the first URL identifies the enterprise intraweb.

5. The client device of claim 1, wherein the protected resource is a remote webmail address of the enterprise network, and wherein the first URL identifies the remote webmail address.

6. The client device of claim 1, wherein the protected resource is a web interface for an internal instant messaging (IM) application of the enterprise network, and wherein the first URL identifies the web interface for the IM application.

7. The client device of claim 1, wherein the VPN handler is configured to encapsulate packets of the first outgoing traffic according to an Internet Protocol Security (IPSec) protocol suite.

8. The client device of claim 1, wherein to transmit the first outgoing data traffic via the VPN connection, the VPN handler is configured to tunnel the first outgoing traffic according to a Layer 2 Tunneling Protocol.

9. The client device of claim 1, wherein the VPN handler is configured to encrypt the first outgoing traffic.

10. The client device of claim 1, wherein the VPN handler is further configured to:

determine that an active browser of the one or more applications has navigated away from the first URL; and based on the active browser having navigated away from the first URL, deactivate the one of the new secure VPN connection or the selected existing secure VPN connection via which the first outbound data traffic was transmitted.

11. The client device of claim 1, wherein the network comprises a public network.

12. The client device of claim 11, wherein the network interface device is coupled to a router over the public network.

13. The client device of claim 1, wherein the network comprises the enterprise network.

14. The client device of claim 1, wherein the network comprises a public network, wherein the network interface device is coupled to a router over the public network, and wherein the router couples the client device to a VPN concentrator.

15. A method comprising:
  storing, to a memory of a client device, a list of one or more uniform resource locators (URLs), each respective URL included in the list being predetermined to correspond with a protected resource of an enterprise network;
  coupling, by a network interface of the client device, the client device with a network;
  monitoring, by a virtual private network (VPN) handler of the client device, one or more application-layer communications output by a plurality of applications executable by the one or more processors;
  based on the monitored one or more application-layer communications, identifying, by the VPN handler of the client device, each attempt of one or more attempts, by the one or more application-layer communications, to access a first URL of the one or more URLs included in the list stored to the memory;
  prior to generating outbound data traffic associated with any of the one or more attempts to access the first URL of the one or more URLs included in the list stored to the memory, performing, by the VPN handler of the client device, one of:
    establishing a new secure VPN connection between the network interface of the client device and a VPN concentrator associated with the enterprise network, or
    selecting an existing secure VPN connection between the network interface of the client device and the VPN concentrator associated with the enterprise network;
  transmitting, by the VPN handler of the client device, via the network interface of the client device, first outbound data traffic associated with a first attempt of the one or more attempts to access the first URL included in the list over one of the new secure VPN connection or the selected existing secure VPN connection;
  based on the monitored one or more application-layer communications, identifying, by the VPN handler of the client device, each attempt of one or more attempts, by the one or more application-layer communications, to access a second URL that is not included in the list stored to the memory;
  prior to generating second outbound data traffic associated with any of the one or more attempts to access the second URL that is not included in the list stored to the memory, performing, by the VPN handler of the client device, one of:
    establishing a new unsecure connection between the network interface of the client device and a public network, or
    selecting an existing unsecure connection between the network interface of the client device and the public network; and
  transmitting, by the VPN handler of the client device, via the network interface of the client device, while the secure VPN connection is active, the second outbound data traffic associated with the second URL that is not included in the list over one of the new unsecure connection or the selected existing unsecure connection.

16. The method of claim 15, wherein monitoring the application-level communications output by the one or more applications comprises monitoring, by the VPN handler of the client device, system calls issued by the plurality of applications.

17. The method of claim 15, further comprising:
  receiving, by the VPN hander, the application-level communications from the plurality of applications;
  filtering the received application-level parameters to obtain a subset of the received application-level parameters; and
  sending each respective application-level parameter of the obtained subset to the VPN handler.

18. The method of claim 15, wherein the protected resource is an enterprise intraweb of the enterprise network, and wherein the first URL identifies the enterprise intraweb.

19. The method of claim 15, wherein the protected resource is a remote webmail address of the enterprise network, and wherein the first URL identifies the remote webmail address.

20. The method of claim 15, wherein the protected resource is a web interface for an internal instant messaging (IM) application of the enterprise network, and wherein the first URL identifies the web interface for the IM application.

21. A non-transitory computer-readable storage medium encoded with instructions that, when executed, cause one or more processors of a client device to:
  store, to a memory of a client device, a list of one or more uniform resource locators (URLs), each respective URL included in the list being predetermined to correspond with a protected resource of an enterprise network;
  couple, using a network interface of the client device, the client device with a network;
  monitor one or more application-layer communications output by a plurality of applications executable by the one or more processors;
  based on the monitored one or more application-layer communications, identify each attempt of one or more attempts, by the one or more application-layer communications, to access a first URL of the one or more URLs included in the list stored to the memory;
  prior to generating outbound data traffic associated with any of the one or more attempts to access the first URL of the one or more URLs included in the list stored to the memory, perform one of:
    establishing a new secure virtual private network (VPN) connection between the network interface of the client device and a VPN concentrator associated with the enterprise network, or selecting an existing secure VPN connection between the network interface of the client device and the VPN concentrator associated with the enterprise network;

transmit, via the network interface of the client device, first outbound data traffic associated with a first attempt of the one or more attempts to access the first URL included in the list over one of the new secure VPN connection or the selected existing secure VPN connection;

based on the monitored one or more application-layer communications, identify each attempt of one or more attempts, by the one or more application-layer communications, to access a second URL that is not included in the list stored to the memory;

prior to generating second outbound data traffic associated with any of the one or more attempts to access the second URL that is not included in the list stored to the memory, perform one of:

establishing a new unsecure connection between the network interface of the client device and a public network, or selecting an existing unsecure connection between the network interface of the client device and the public network; and transmit, via the network interface of the client device, while the secure VPN connection is active, the second outbound data traffic associated with the second URL that is not included in the list over one of the new unsecure connection or the selected existing unsecure connection.

* * * * *